(12) United States Patent
Sitwala et al.

(10) Patent No.: US 10,904,954 B2
(45) Date of Patent: Jan. 26, 2021

(54) RAILLESS SUPPORT OF BILLETS WITHIN ELECTRIC INDUCTION HEATING COILS

(71) Applicant: Inductoheat, Inc., Madison Heights, MI (US)

(72) Inventors: Chirag G. Sitwala, Ahmedabad (IN); Gary A. Doyon, Grosse Pointe Farms, MI (US); Doug R. Brown, Rochester, MI (US)

(73) Assignee: INDUCTOHEAT, INC., Madison Heights, MI (US)

( * ) Notice: Subject to any disclaimer, the term of this patent is extended or adjusted under 35 U.S.C. 154(b) by 175 days.

(21) Appl. No.: 15/968,119

(22) Filed: May 1, 2018

(65) Prior Publication Data

US 2018/0359816 A1 Dec. 13, 2018

Related U.S. Application Data

(60) Provisional application No. 62/536,638, filed on Jul. 25, 2017.

(30) Foreign Application Priority Data

Jun. 7, 2017 (IN) .............................. 201711019983

(51) Int. Cl.
*H05B 6/22* (2006.01)
*H05B 6/10* (2006.01)
(Continued)

(52) U.S. Cl.
CPC ................ *H05B 6/101* (2013.01); *B21J 1/06* (2013.01); *C21D 1/42* (2013.01); *H05B 6/14* (2013.01);
(Continued)

(58) Field of Classification Search
CPC .................. F27D 99/0006; F27D 3/04; F27D 2003/0085; F27D 2099/0015; F27B 9/24;
(Continued)

(56) References Cited

U.S. PATENT DOCUMENTS

| 4,011,901 A | * | 3/1977 | Flemings | ................. B22D 2/00 164/457 |
| 5,212,123 A | | 5/1993 | Schoennahl | |

(Continued)

FOREIGN PATENT DOCUMENTS

| JP | 2002-293611 A | 10/2002 |
| JP | 2015-85372 A | * 5/2015 |

OTHER PUBLICATIONS

China Industrial Construction Standardization Association Industrial Furnace Masonry Professional Committee, Furnace Engineering Manual, p. 155, Metallurgical Industry Press, Jan. 31, 2007.

(Continued)

*Primary Examiner* — Hung D Nguyen
(74) *Attorney, Agent, or Firm* — Philip O. Post (57) ABSTRACT

A railless billet electric induction heating apparatus and method is provided where billets are continuously or statically heated by induction by moving the billets without billet support rails through an induction coil supplied with alternating current power when the billets are in direct sliding contact with the interior surface of a clay graphite billet slider disposed within the induction coil. The clay graphite billet slider can also provide thermal insulation between the induction coil and the clay graphite billet slider to eliminate the requirement for a separate induction coil refractory.

14 Claims, 4 Drawing Sheets

(51) Int. Cl.
  *B21J 1/06* (2006.01)
  *H05B 6/14* (2006.01)
  *C21D 1/42* (2006.01)
  *F27D 3/00* (2006.01)
  *F27D 3/04* (2006.01)
  *F27D 99/00* (2010.01)

(52) U.S. Cl.
  CPC ........ *F27D 3/04* (2013.01); *F27D 2003/0085* (2013.01); *F27D 2099/0015* (2013.01)

(58) Field of Classification Search
  CPC ................ F27B 9/36; F27B 2009/3607; F27B 2009/3623; H05B 6/02; H05B 6/06; H05B 6/101; H05B 6/102; H05B 6/14; H05B 6/44; B21J 1/04; B21J 1/06; C21D 1/42
  USPC ....... 219/635, 639, 645–647, 649, 653, 654, 219/655, 656, 662, 671, 672, 674, 676
  See application file for complete search history.

(56) References Cited

U.S. PATENT DOCUMENTS

2006/0000826 A1   1/2006   Cordier et al.
2006/0140245 A1   6/2006   Wynn et al.
2015/0380118 A1   12/2015   Franz et al.

OTHER PUBLICATIONS

Hu Baoyu, Xu Yanqing, Zhang Hongda, Practical Technical Manual for Special Refractories, p. 363, Metallurgical Industry Press, Jun. 20, 2004.

* cited by examiner

PRIOR ART

RAILLESS SUPPORT OF BILLETS WITHIN ELECTRIC INDUCTION HEATING COILS

CROSS REFERENCE TO RELATED APPLICATIONS

This application claims priority to and the benefit of India Patent Application No. 201711019983 filed in the Indian Patent Office on Jun. 7, 2017 and U.S. Provisional Patent Application No. 62/536,638 filed on Jul. 25, 2017, the entire contents of both applications are incorporated herein by reference.

FIELD OF THE INVENTION

The present invention relates to railless support of billets within electric induction coils for induction heating of the billets for further processing in various industrial processes including forging the billets into articles of manufacture.

BACKGROUND OF THE INVENTION

Billets composed of materials that are at least partially electromagnetically conductive can be inductively pre-heated to a high temperature, for example, in the range of 900° C. to 1300° C. and above, for subsequent hot working in processes that include forging, upset forging, rolling, extrusion and drawing. Induction pre-heating of the billets can be accomplished by placing the billets within an induction coil supplied with alternating current from a suitable power source. Refractory is placed between the induction coil and billet to retain induced heat in the billet and protect the induction coil from high temperature radiation and convection heat from the billet within the induction coil.

United Kingdom Patent No. GB 892447 A recognizes some of the problems with allowing a billet to rest on refractory within the induction coil and discloses the solution of using rails within the coil for sliding the heated billet through the coil. As pointed out in GB 892447 A further improvements in the art led to rails with interior forced fluid cooling to overcome problems with uncooled rails. The contribution of GB 892447 A to the art was a rail partially buried within the refractory which kept the billet off of the refractory surface but the rail was still subject to some scale build up on the rail from a hot billet sliding over the rail. Thus the purpose of the refractory is thermal control and the purpose of the rails is to provide efficient movement of billets through the induction coil.

U.S. Pat. No. 7,528,351 B2 further advances the art with adjustable rails that can be formed from a ceramic material such as sialon.

Figure 1A:
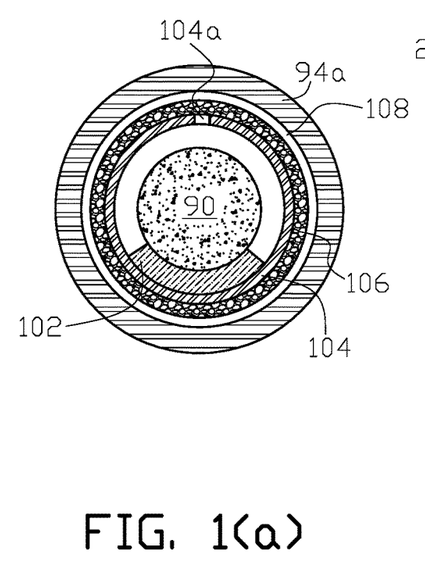
FIG. 1(a) through FIG. 1(d) are transverse cross sectional illustrations of typical prior art billet electric induction heating systems.
Figure 1B:
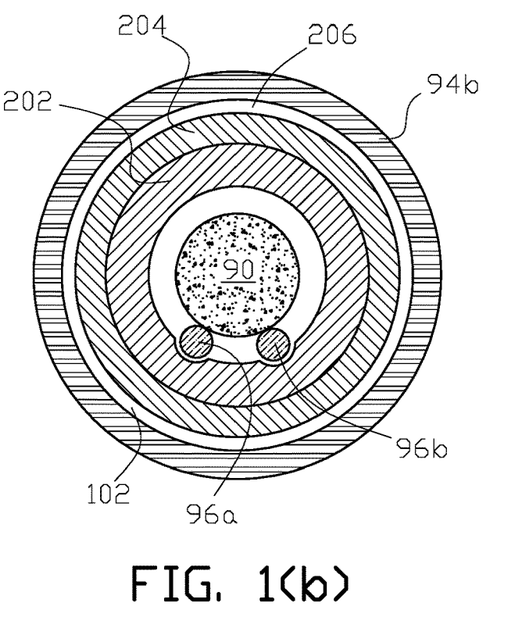
Figure 1C:
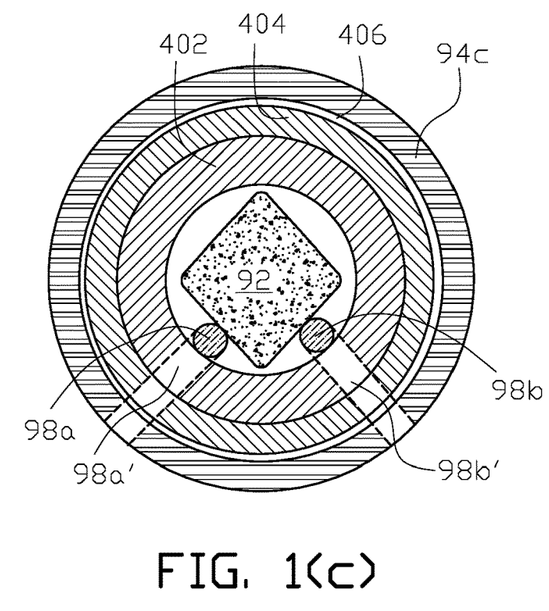
Figure 1D:
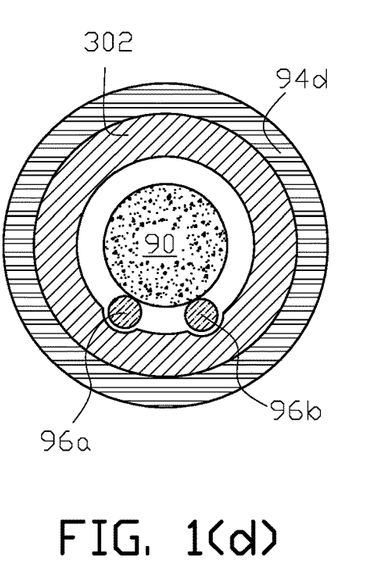

FIG. 1(a) through FIG. 1(d) are transverse cross sectional illustrations of typical billet electric induction heating systems found in the prior art. In the prior art billet induction heating system of FIG. 1(a) cylindrical billet 90 is seated on an open-ended partially-cylindrical stainless steel strip billet support 102 as it passes through billet induction heating coil 94a. Billet support 102 separates the billet from refractory 106 along with stainless steel liner 104 having a cross sectional gap 104a. Billet induction heating coil 94a is separated from refractory 106 by an insulating layer of glass tape 108. In the prior art billet induction heating system of FIG. 1(b) cylindrical billet 90 is seated on billet support rails 96a and 96b as it passes through billet induction heating coil 94b. Support rails 96a and 96b are partially embedded in refractory liner 202 which is surrounded by refractory felt 204 and glass tape 206. In the prior art billet induction heating system of FIG. 1(c) rectangular billet 92 is seated on billet support rails 98a and 98b as it passes through billet induction heating coil 94c. Support rails 98a and 98b have a range of adjustability around the outer circumference of the billet by means of adjustable supports 98a' and 98b' respectively. The support rails rest on the interior circumference of refractory liner 402 which is surrounded by refractory felt 404. Glass tape 406 separates the refractory felt from coil 94c. In the prior art billet induction heating system of FIG. 1(d) cylindrical billet 90 is seated on rails 96a and 96b partially embedded in refractory 302 as it passes through billet induction heating coil 94d. The arrangement in FIG. 1(d) is similar to one embodiment disclosed in GB 892447 A. In these four prior art embodiments a billet is supported by either longitudinal rails or a semi-circular stainless steel support as it passes through the billet induction heating coil as further described in "Conduction and induction heating" (author E. J. Davies; pages 236-241; published by Peter *Peregrinus* Ltd., London, United Kingdom (1990)).

What is not found in the prior art is a railless billet support billet electric induction heating system that provides an increased productivity billet heating rate in combination with a billet slider material having a sufficiently longer life in terms of the number of billets that can be heated within the electric induction heating system before replacement due to billet abrasion wear.

It is one object of the present invention to provide an increased productivity billet heating rate in combination with a billet slider material having a sufficiently longer life in terms of the number of billets that can be heated before replacement due to billet abrasion wear.

BRIEF SUMMARY OF THE INVENTION

In one aspect the present invention is a clay graphite billet slider for moving a billet through an induction coil supplied with an alternating current with the billet seated on the clay graphite billet slider.

In another aspect the present invention is a railless billet electric induction heating system having an induction coil powered by an alternating current power source and a clay graphite billet slider disposed within the induction coil. The clay graphite billet slider is electrically isolated from the induction coil and an interior surface region of the clay graphite billet slider forms a billet slider surface for moving a billet seated on the interior surface region of the clay graphite billet slider through the induction coil to statically or continuously heat the billet to a target temperature.

In another aspect the present invention is a hot working process system having an induction coil powered by an alternating current power source and a clay graphite billet slider disposed within the induction coil. The clay graphite billet slider is electrically isolated from the induction coil and an interior surface region of the clay graphite billet slider forms a billet slider surface for moving a billet seated on the interior surface region of the clay graphite billet slider through the induction coil to statically or continuously heat the billet to a target temperature. A hot working apparatus is provided for receiving the heated billet to form a hot worked article of manufacture.

In another aspect the present invention is a method of forming a billet electric induction heating system by providing an induction coil connected to an alternating current power source; inserting a clay graphite billet slider within the induction coil with the clay graphite billet slider having an interior billet through opening with an interior slider surface for sliding a billet seated on the interior through surface through the induction coil; and electrically isolating the clay graphite slider inserted within the induction coil from the induction coil.

In another aspect the present invention is a method of hot working a billet heated to a hot working target temperature by moving the billet through a clay graphite billet slider disposed within the induction coil connected to an alternating current by sliding the billet from an entrance to the clay graphite billet slider on an interior surface of the clay graphite billet slider in a static or continuous inductive heating of the billet through the induction coil to the hot working target temperature to form a heated billet at an exit of the induction coil; transferring the heated billet from the exit of the induction coil to a hot working apparatus; and hot working the heated billet in the hot working apparatus to form an article of manufacture.

In another aspect the present invention is a railless billet electric induction heating system having an induction coil powered by an alternating current and a refractory within the induction coil. A clay graphite billet carrier is provided for moving a billet disposed in the clay graphite billet carrier through the induction coil in sliding contact with the refractory.

The above and other aspects of the present invention are set forth in this specification and the appended claims.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 2A:
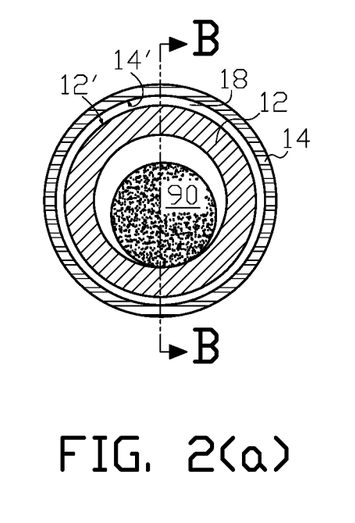
FIG. 2(a) is a transverse cross sectional elevation view through line A-A in FIG. 2(b) of one example of a billet electric induction heating system of the present invention with a clay graphite billet slider and an example billet within the slider and an induction coil.
Figure 2B:
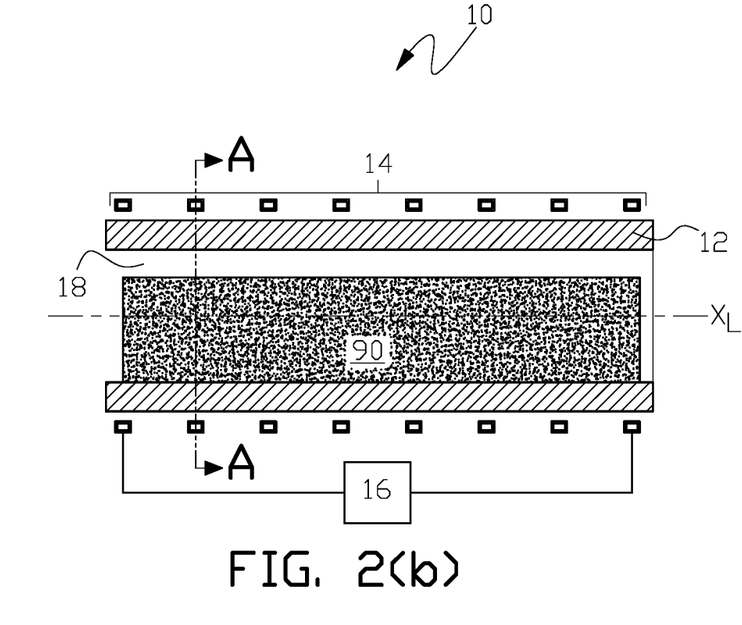
FIG. 2(b) is a longitudinal cross sectional elevation view through line B-B in FIG. 2(a) of the billet electric induction heating system in FIG. 2(a).

There is shown in FIG. 2(a) and FIG. 2(b) one example of a billet electric induction heating system 10 of the present invention that utilizes a clay graphite billet slider. In the figures billet slider 12 is disposed between induction heating coil 14 and the interior passage of the billet slider through which billet 90 passes to be inductively heated to a target temperature. The induction coil is suitably connected to an alternating current source 16 that inductively heats the billet passing through the interior passage of the induction coil.

The clay graphite billet slider in the embodiment of the invention shown in FIG. 2(a) and FIG. 2(b) may be in the shape of an open-ended hollow right circular cylinder to conform to an induction coil having a similar open volume interior shape.

In alternative embodiments of the invention the induction coil may be one or more separate coils of any type, including a solenoidal induction coil or a channel induction coil, that may be supplied alternating current electric power from one or more power supplies. The induction coil may optionally be fluid cooled, for example, by flowing a liquid or gas through an interior through passage as known in the art.

The billet heating process may be a continuous mode heating process where the billet moves through the coil while in sliding contact with the interior surface of the clay graphite billet slider at a continuous steady state (or variable) speed, or a progressive mode heating process where the billet moves sequentially through multiple coils while in sliding contact with the surface of the clay graphite billet slider in each of the multiple coils at a continuous steady state (or variable) speed. Alternatively the billet heating process may be a static mode heating process where the billet is moved into the interior of an induction coil in sliding contact with the interior surface of the clay graphite billet slider to a static billet heating position within the coil for induction heating to the target temperature, and after reaching the target heated temperature the heated billet is moved out of the interior of the induction coil in sliding contact with the interior surface of the clay graphite slider.

Suitable billet movement apparatus known in the art can be used to move the billet along through an induction heating coil while in sliding contact with the interior surface of a clay graphite billet slider of the present invention such as a tractor or conveyor feeding billets onto the interior surface of the clay graphite billet slider. In some embodiments of the invention the axial length of the induction coil and the clay graphite billet slider may be sufficiently long so that a plurality of billets can be sliding on the clay graphite billet slider within an induction coil in a back-to-back arrangement with the external tractor or conveyor pushing the plurality of back-to-back billets sliding on the clay graphite billet slider through the induction coil.

A spacer annular volume 18 is preferably provided along the axial length $X_L$ of the induction coil and clay graphite billet slider to separate the inner facing surfaces of the induction coil and the outer facing surfaces of the clay graphite billet slider to prevent electrical arcing of the coil or other damage to the coil. When provided the spacer annular volume may be an unfilled air volume or filled with an electrical insulation material, a thermal insulation material, or an electrical and thermal insulation material, for example, a laminated mica paper. In other embodiments of the invention there may not be a spacer annular volume to separate the coil and the slider; however a shorter service life of the electric induction billet heating system may result in such an arrangement.

A slider material mounting apparatus may be provided in some embodiments of the invention to provide replacement of a worn clay graphite billet slider without disassembly of the billet electric induction heating system.

Although the clay graphite billet slider in FIG. 2(a) and FIG. 2(b) is in the shape of an open-ended hollow right cylinder to conform with the open volume interior shape of the induction coil, in other examples of the invention the shape of the interior surface, exterior surface or both the interior and exterior surfaces of the clay graphite billet slider may be of other shapes to accommodate the shape of the billet that will be in sliding contact with the hollow interior surface of the clay graphite billet slider or the shape of the open interior volume of the induction coil, or a combination of both the shapes and properties of the billet and the coil. For example a clay graphite hollow rectangular tube may be provided in an application where the billet has a rectangular transverse cross sectional shape.

Preferably the thermal conduction of the clay graphite slider material used for a billet slider in the present invention should not exceed 15 W/(m·C) which, for example, would preferably, but not exclusively, require a clay graphite billet slider with a wall thickness in the range of 10 mm to 30 mm as a function of the weight of a typical billet being inductively heated, the applied output frequency from the power source to the induction coil and the target heating temperature for the billet. If the clay graphite slider material used for a billet slider does not exceed 15 W/(m·C) then the clay graphite billet slider will also provide effective thermal control without an additional refractory material for the billet electric induction heating system.

Table 1 illustrates one example of selected improvements over a prior art rail billet electric induction heating system for examples 1, 2 and 3 of a billet electric induction heating system of the present invention that utilizes a clay graphite billet slider similar to that in the embodiment of the invention in FIG. 2(a) and FIG. 2(b).

The induction coil (Inductotherm Corp. part no. HFAC000577) used in all examples was the same, as well as the inverter load induction coil matching transformer (with a ratio of 20:04) and capacitor (71.92 microfarads) with heating of the example billets to a target temperature of 1250° C. A heated billet's target temperature is defined for a particular application and can be, for example, a heated billet's surface temperature or cross sectional average temperature.

Time/PC is the time per piece (billet) and mm/sec is the speed at which each example billet travels through the induction coil to achieve the target temperature of 1250° C. in all examples.

The prior art rail induction heating system utilized dual billet rail sliders with the rails spaced apart from each other around the inner circumference of a refractory similar to that shown in FIG. 1(d) except that the rails were located on the inner circumference of the refractory rather than being partially embedded as in FIG. 1(d). The rails were internally cooled via a circulating water system.

From the examples in Table 1, it will be appreciated that the billet electric induction heating system of the present invention with a clay graphite billet slider results in an improved billet heating input energy measured as billet kg per input energy kW-hour (kg/kW-hr) calculated as follows. In example 1 of the present invention and the prior art rail heating system the 50 mm diameter billet weighed 4.8 kg. In example 1 of the present invention input coil power was 68.667 kW that achieved the billet target temperature of 1250° C. in 80 seconds which results in a calculated energy consumption of $$3.1456 \text{ kg/kW-hr} = \frac{4.8 \text{ kg}}{68.667 \text{ kW} * 80 \text{ sec} * 3600 \text{ sec/hr}}.$$

TABLE 1

| | Railless clay graphite heating systems of the present invention | | | Prior art rail heating system |
| --- | --- | --- | --- | --- |
| | Example 1 | Example 2 | Example 3 | Prior art example |
| Billet Diameter (mm) | 50 | 60 | 56 | 50 |
| Length (mm) | 311 | 120 | 105 | 311 |
| Weight (kg) | 4.8 | 2.6 | 2 | 4.8 |
| Line Voltage (V) | 415 | 415 | 416 | 415 |
| Line Current (A) | 113 | 131 | 122 | 104 |
| Power (kW) | 68.66703544 | 79.60514728 | 74.31473254 | 63.19797952 |
| Output Voltage (V) | 625 | 595 | 608 | 622 |
| Inverter Current (A) | 190 | 190 | 190 | 190 |
| Output Frequency (f) | 3.32 KHz | 3.4 KHz | 3.35 KHz | 3.3 KHz |
| Time/PC (Sec) | 80 | 36.5 | 29 | 95 |
| mm/sec | 3.8875 | 3.287671233 | 3.620689655 | 3.273684211 |
| PRODUCTIVITY (KG/(KW-HOUR)) | 3.145614174 | 3.221379081 | 3.340870021 | 2.878173293 |

Table 1 heating system and process parameters are as follows.

Diameter, length and weight are properties of the example billets.

Line voltage, current and power are electrical parameters of the input to the (inverter) power source supplying alternating current power to the induction coil.

Output voltage, inverter current and output frequency are electrical parameters of the output from the (inverter) power source supplying alternating current power to the induction coil.

In the prior art rail heating system input coil power was 63.198 kW that achieved the billet target temperature of 1250° C. in 95 seconds which results in a calculated energy consumption of $$2.8782 \text{ kg/kW-hr} = \frac{4.8 \text{ kg}}{63.198 \text{ kW} * 95 \text{ sec} * 3600 \text{ sec/hr}}.$$

Therefore comparing the energy efficiency for invention example 1 in Table 1 with the prior art example in Table 1 where the example billets have identical properties, a significant (rounded off) productivity rate of 3.15 was achieved in invention example 1 compared to the prior art example productivity rate of 2.88 which translates into a numeric value of 1.094 (3.15/2.88) increased productivity rate and an approximately 10 percent increased energy efficiency of the electric induction billet heating system of the present invention over the prior art rail heating system.

1 kW-hr of energy (on average) used for heating billets can produce approximately 3.15 kg of heated billet material, such as a steel billet, using the billet electric induction heating system of the present invention compared to approximately 2.88 kg of heated steel using the prior art rail billet heating system, which represents an approximately 10 percent increase in the production of heated steels using the same energy consumption. Additionally a billet electric induction heating system of the present invention requires approximately 0.317 kW-hr to heat 1 kg of steel (1/3.15 kW-hr per kg) compared to approximately 0.347 kW-hr per 1 kg of steel (1/2.88=0.347 kW-hr per kg) for a prior art rail billet heating system using an identical induction coil, which represents a substantial energy savings and an improvement in energy efficiency of induction heating of billets.

Additionally the clay graphite billet slider material of the present invention exhibits improved wear characteristics over known prior art apparatus for moving a billet through a billet electric induction heating system which reduces replacement or repair requirements of the billet induction heating system.

Figure 3A:
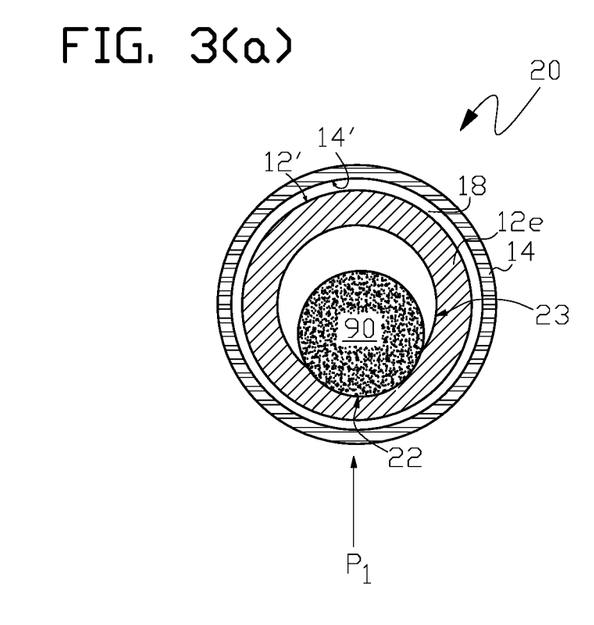
FIG. 3(a) and FIG. 3(b) are alternative transverse cross sectional elevation views of another example of a billet electric induction heating system of the present invention with a clay graphite billet slider where the billet slider is rotatable about the slider's longitudinal axis.
Figures 3B, 4:
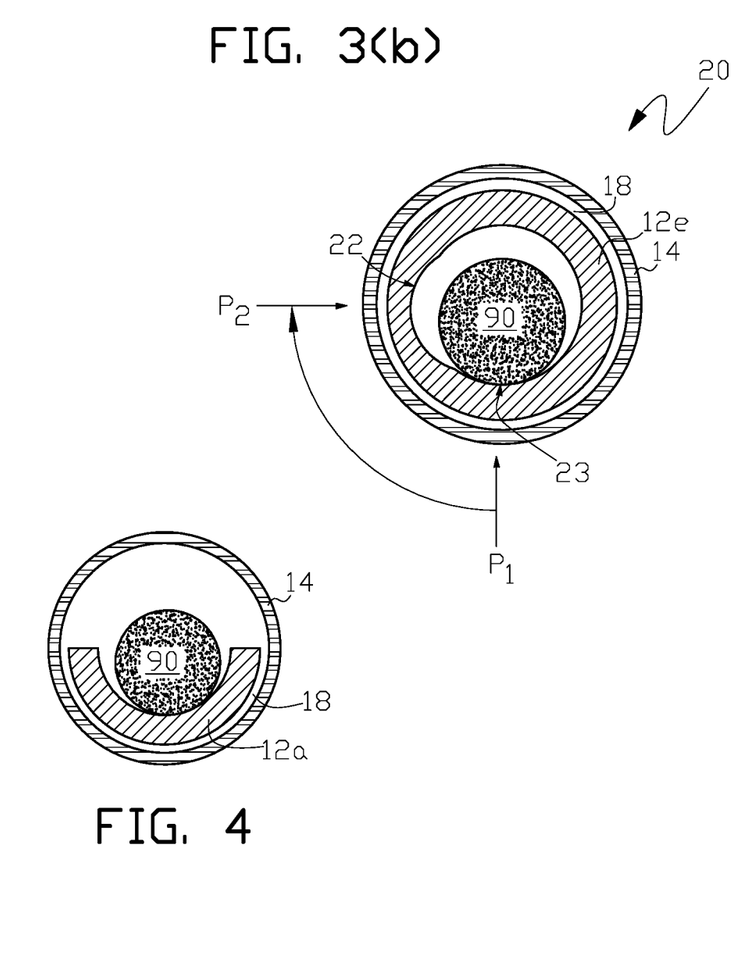
FIG. 4 is a transverse cross sectional elevation view of another example of a billet electric induction heating system of the present invention with a clay graphite billet slider where the clay graphite billet slider is in the shape of an open-ended partially-cylindrical shell.

There is shown in FIG. 3(a) and FIG. 3(b) another embodiment of a billet electric induction heating system 20 of the present invention that utilizes a clay graphite billet slider. In this embodiment longitudinal axial ($X_L$) rotation of clay graphite billet slider 12e can be accomplished after a specified amount of billet abrasion wear on the clay graphite billet slider's interior surface region 22 from moving billets in sliding contact with the interior surface region. The axial rotation of the billet slider moves worn slider surface region 22 out of the billet's normal sliding surface path on the clay graphite billet slider's interior surface so that an unworn interior surface region 23 of the billet slider replaces the worn interior surface region. In FIG. 3(a) worn interior surface region 22 in radial position $P_1$ is moved to radial position $P_2$ in FIG. 3(b) by a 90 degrees clockwise rotation of clay graphite billet slider 12e to provide an unworn interior surface region in the billet's normal sliding surface path through an induction coil in a billet electric induction heating apparatus of the present invention.

In order to minimize the applied force and torque required to achieve rotation of the clay graphite billet slider without disturbing the induction coil, annular spacer volume 18 between the interior electrically conductive surfaces 14' of induction coil 14 and the outer surface 12' of the clay graphite billet slider 12 facing the coil can be filled with mica paper or other electrical insulating material exhibiting a low friction surface roughness and slip-plane properties in some embodiments of the invention to provide high-temperature dielectric protection for the electrically conductive coil winding and a rotational slip plane that can facilitate axial rotation of the clay graphite billet slider without disturbing the induction coil.

In other examples of the present invention where the clay graphite billet slider is replaceable without disassembly of the billet electric induction heating system annular spacer volume 18 between the interior electrically conductive surfaces 14' of induction coil 14 and the outer surface 12' of the clay graphite billet slider 12 facing the coil can be filled with mica paper or other electrical insulating material exhibiting a low friction surface roughness and slip-plane properties to provide high-temperature dielectric protection for the electrically conductive coil winding and a rotational slip plane that can facilitate movement of the clay graphite billet slider along the axial length of the billet slider and induction coil so that a replaceable clay graphite billet slider can be inserted into the induction coil or removed from within the induction coil.

In some embodiments of the invention where the clay graphite billet slider is used in a shape other than a generally hollow interior cylinder, for example, when used for moving a rectangular solid workpiece (billet) or hollow tube, as well as workpieces (billets) of non-cylindrical general shape, longitudinal rotation, axial or otherwise, of the existing clay graphite billet slider as appropriate for the shape of the billet slider can be accomplished so that an unworn region of the billet slider is selected as the surface on which a billet is in sliding contact with it as it moves through an induction coil.

FIG. 4 illustrates another embodiment of the present invention where the clay graphite billet slider 12a is formed as an open-ended semi-cylindrical clay graphite billet slider. In other examples of the invention an open-ended partially-cylindrical clay graphite billet slider may be used that is greater than or less than a semi (half) cylinder in shape as may be required for a particular application.

Figure 5A:
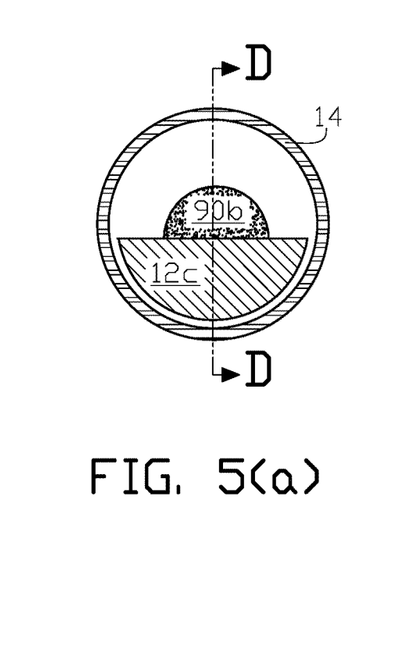
FIG. 5(a) is a transverse cross sectional elevation view through line C-C in FIG. 5(b) of another example of a billet electric induction heating system of the present invention with a clay graphite billet slider for each billet moving through an induction coil.
Figure 5B:
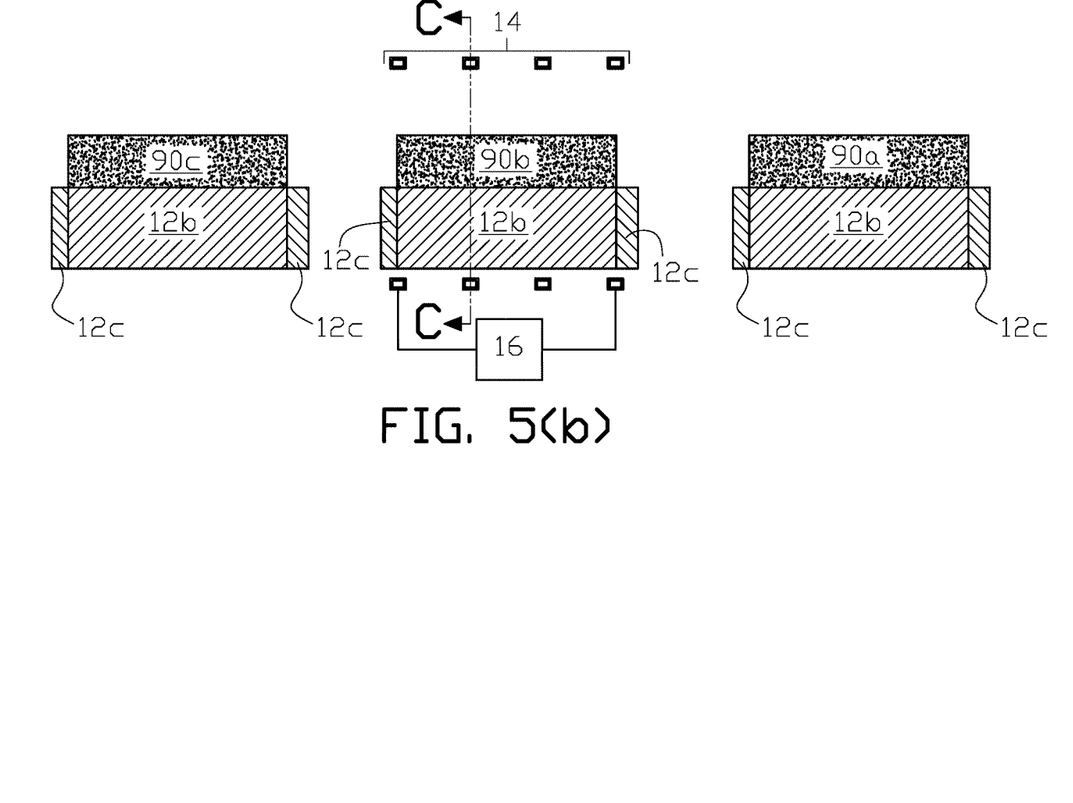
FIG. 5(b) is a longitudinal cross sectional elevation view through line D-D in FIG. 5(a) of the billet electric induction heating system in FIG. 5(a) with one billet disposed in a clay graphite billet slider inserted in the induction coil; one heated billet after exiting the induction coil; and one billet staged for entry into the induction coil after heating of the billet within the induction coil is completed.

FIG. 5(a) and FIG. 5(b) illustrate another embodiment of the present invention where the clay graphite billet slider is in the form of a partially (or totally) enclosed clay graphite material billet carrier for each individual billet 90a (next billet to be heated), 90b (billet in process of being heated) and 90c (previous billet heated) that delivers an individual billet to the interior of induction coil 14 and removes it from the interior of the induction coil after heating. In this non-limiting example each billet carrier is formed from a U-shaped longitudinal length of clay graphite material 12b and the front and rear ends of each billet container are formed from a semi-circular disc 12c attached to the opposing longitudinal ends of the U-shaped longitudinal length of the clay graphite material where the clay graphite billet carrier is more generally referred to as a closed-end partial hollow cylinder. In this embodiment of the invention the clay graphite billet carrier can be moved through an induction coil by sliding the clay graphite billet carrier on a refractory disposed within the induction coil of a billet electric induction heating system of the present invention.

In some embodiments of the invention in-line (or otherwise arranged) multi-coil electric induction heating systems with clay graphite billet sliders are used to produce a billet heated to a target temperature at the line's exit end. Clay graphite billet sliders in coils of the multi-coil system positioned at or near to the line's exit end will experience faster billet abrasion wear than the clay graphite billet sliders in coils at or near the line's entry end since a billet is progressively heated to a higher temperature as it moves through coils from the entry end to the exit end of the line and the hotter the surface temperature of the billet, the greater is the amount of abrasion as the billet slides on a clay graphite billet slider of the present invention.

In addition to providing axially rotational clay graphite billet sliders as illustrated in FIG. 3(a) and FIG. 3(b) at least in induction coils at or near the line's exit end, a replaceable clay graphite billet slider can be provided in at least some of the induction coils so that clay graphite billet sliders in coils at or near the line's exit end with greater wear than clay graphite billet sliders in coils at or near the line's entry end can be interchanged periodically to balance the life wear cycle of all billet sliders in the multi-coil electric induction heating systems of the present invention.

Optionally in some embodiments of the invention a clay graphite billet slider may be formed with one or more protrusions or profiled variable elevations on an interior surface region of the billet slider upon which the billet is in sliding contact to conform with a billet shape or to enhance billet heating characteristics in a particular application.

In some embodiments of the invention a billet electric induction heating system with a clay graphite billet slider may be combined with a hot working apparatus for hot working a billet heated in the billet electric induction heating system to form an article of manufacture or intermediate goods that are further processed to form an article of manufacture. The hot working apparatus includes, but is not limited to, forging, rolling, extrusion and drawing apparatus known in the art for hot working a billet heated in a billet electric induction heating system of the present invention.

The term "clay graphite" slider material as used herein refers preferably to a billet slider material composition comprising: carbon (C) between 30 to 40 percent by weight; silicon carbide (SiC) between 8 to 12 percent by weight; silicon dioxide ($SiO_2$) between 15 to 25 percent by weight; and aluminum oxide ($Al_2O_3$) between 10 to 20 percent by weight. Carbon in the stated range was found to provide a superior billet abrasion wear.

In addition the billet slider material composition may also contain: trace oxides preferably not exceeding 6 percent by weight in aggregate typically formed from iron, boron, sodium and potassium oxides; compounds of magnesium, cobalt and chromium no greater than 2 percent by weight in aggregate; and elemental (free) silicon not greater than 1 percent by weight.

A clay graphite billet slider material of a shape appropriate for a particular electric induction billet heating system application can be produced from the billet slider material composition, for example, in an extrusion or injection molding process.

In the description above, for the purposes of explanation, numerous specific requirements and several specific details have been set forth in order to provide a thorough understanding of the example and embodiments. It will be apparent however, to one skilled in the art, that one or more other examples or embodiments may be practiced without some of these specific details. The particular embodiments described are not provided to limit the invention but to illustrate it.

Reference throughout this specification to "one example or embodiment," "an example or embodiment," "one or more examples or embodiments," or "different example or embodiments," for example, means that a particular feature may be included in the practice of the invention. In the description various features are sometimes grouped together in a single example, embodiment, figure, or description thereof for the purpose of streamlining the disclosure and aiding in the understanding of various inventive aspects.

The present invention has been described in terms of preferred examples and embodiments. Equivalents, alternatives and modifications, aside from those expressly stated, are possible and within the scope of the invention.

The invention claimed is:

1. A clay graphite billet slider for moving a billet through an at least one induction coil supplied with an alternating current with the billet seated on the clay graphite billet slider when moving through the at least one induction coil, the clay graphite billet slider having a slider composition of:
   carbon (C) between 30 to 40 percent by weight;
   silicon carbide (SiC) between 8 to 12 percent by weight;
   silicon dioxide ($SiO_2$) between 15 to 25 percent by weight; and
   aluminum oxide ($Al_2O_3$) between 10 to 20 percent by weight.

2. The clay graphite billet slider of claim 1 wherein the clay graphite billet slider comprises an open-ended hollow cylinder, an open-ended partial-cylinder or an open-ended hollow rectangular tube disposed within the at least one induction coil.

3. The clay graphite billet slider of claim 1 wherein the at least one induction coil comprises a solenoidal induction coil and the clay graphite billet slider comprises an open-ended hollow cylinder, an open-ended partial-cylinder or an open-ended hollow rectangular tube disposed within the at least one induction coil.

4. The clay graphite billet slider of claim 1 with the slider composition further comprising one or more oxides not exceeding in the aggregate 6 percent by weight of the slider composition selected from iron, boron, sodium and potassium oxides; one or more magnesium, cobalt and chromium compounds not exceeding in the aggregate 2 percent by weight of the slider composition; and elemental silicon not exceeding 1 percent by weight of the slider composition.

5. A railless billet electric induction heating system comprising:
   an at least one induction coil;
   an at least one alternating current power source connected to the at least one induction coil; and
   a clay graphite billet slider disposed within each of the at least one induction coil, the clay graphite billet slider formed from a slider composition of:
   carbon (C) between 30 to 40 percent by weight;
   silicon carbide (SiC) between 8 to 12 percent by weight;
   silicon dioxide ($SiO_2$) between 15 to 25 percent by weight; and
   aluminum oxide ($Al_2O_3$) between 10 to 20 percent by weight,
   the clay graphite billet slider electrically isolated from the at least one induction coil, an interior surface region of the clay graphite billet slider forming a billet slider surface for moving a billet seated on the interior surface region of the clay graphite billet slider through the at least one induction coil to statically or continuously heat the billet to a target temperature.

6. The railless billet electric induction heating system of claim 5 with the slider composition further comprising one or more oxides not exceeding in the aggregate 6 percent by weight of the slider composition selected from iron, boron, sodium and potassium oxides; one or more magnesium, cobalt and chromium compounds not exceeding in the aggregate 2 percent by weight of the slider composition; and elemental silicon not exceeding 1 percent by weight of the slider composition.

7. The railless billet electric induction heating system of claim 5 wherein an annular spacer volume is provided between a slider facing surface of the at least one induction coil and a coil facing surface of the clay graphite billet slider.

8. The railless billet electric induction heating system of claim 7 further comprising a slip-plane material in the annular spacer volume for rotation of the clay graphite billet slider around an axial longitudinal axis of the clay graphite billet slider without movement of the at least one induction coil.

9. The railless billet electric induction heating system of claim 7 further comprising a slip-plane material in the annular spacer volume for insertion or removal of the clay graphite billet slider disposed in the at least one induction coil or a slip-plane material in the annular spacer volume for rotation of the clay graphite billet slider around the axial longitudinal axis of the clay graphite billet slider without movement of the at least one induction coil.

10. The railless billet electric induction heating system of claim 7 wherein the at least one induction coil comprises a plurality of induction coils in an in-line multi-coil induction heating system and the clay graphite billet slider in each of the plurality of induction coils further comprises a slip-plane material in the annular spacer volume for rotation of the clay graphite billet slider around it axial longitudinal axis or a slip-plane material in the annular spacer volume for insertion or removal of the clay graphite billet slider disposed in each of the plurality of induction coils.

11. The railless billet electric induction heating system of claim 7 wherein the clay graphite billet slider provides a thermal insulation between the at least one induction coil and the clay graphite billet slider.

12. The railless billet electric induction heating system of claim 11 wherein the slider composition has a thermal conduction value not exceeding 15 W per m·C.

13. A method of forming a billet electric induction heating system, the method comprising:
provinding an at least one induction coil connected to an at least one alternating current power source;
forming at least one clay graphite billet slider from a composition of:
carbon (C) between 30 to 40 percent by weight;
silicon carbide (SiC) between 8 to 12 percent by weight;
silicon dioxide ($SiO_2$) between 15 to 25 percent by weight; and
aluminum oxide ($Al_2O_3$) between 10 to 20 percent by weight;
inserting each of the at least one clay graphite billet slider within each of the at least one induction coil, each of the at least one clay graphite billet slider having an interior billet through opening with an interior slider surface for sliding a billet seated on the interior slider surface through the at least one induction coil; and
electrically isolating each of the at least one clay graphite billet slider from the at least one induction coil in which the at least one clay graphite billet slider is inserted.

14. The method of claim 13 further forming the composition from one or more oxides not exceeding in the aggregate 6 percent by weight of the slider composition selected from iron, boron, sodium and potassium oxides; one or more magnesium, cobalt and chromium compounds not exceeding in the aggregate 2 percent by weight; and elemental silicon not exceeding 1 percent by weight of the slider composition.

* * * * *